(No Model.)

A. K. McKEE.
Car Coupling Tool.

No. 241,047. Patented May 3, 1881.

Witnesses.
F. G. Kay
N. J. Cook

Inventor Alexander K. McKee
By Attorney James G. Kay

N. PETERS, Photo-Lithographer, Washington, D. C.

UNITED STATES PATENT OFFICE.

ALEXANDER K. McKEE, OF WEST BROWNSVILLE, PENNSYLVANIA, ASSIGNOR TO HIMSELF AND WM. H. McKINLEY, OF SAME PLACE.

CAR-COUPLING TOOL.

SPECIFICATION forming part of Letters Patent No. 241,047, dated May 3, 1881.

Application filed September 21, 1880. (No model.)

*To all whom it may concern:*

Be it known that I, ALEXANDER K. McKEE, of West Brownsville, in the county of Washington and State of Pennsylvania, have invented a new and useful Improvement in Hand Couplers for Coupling Railroad-Cars; and I do hereby declare the following to be a full, clear, and exact description thereof, reference being had to the accompanying drawings, forming a part of this specification, in which—

Figure 1:
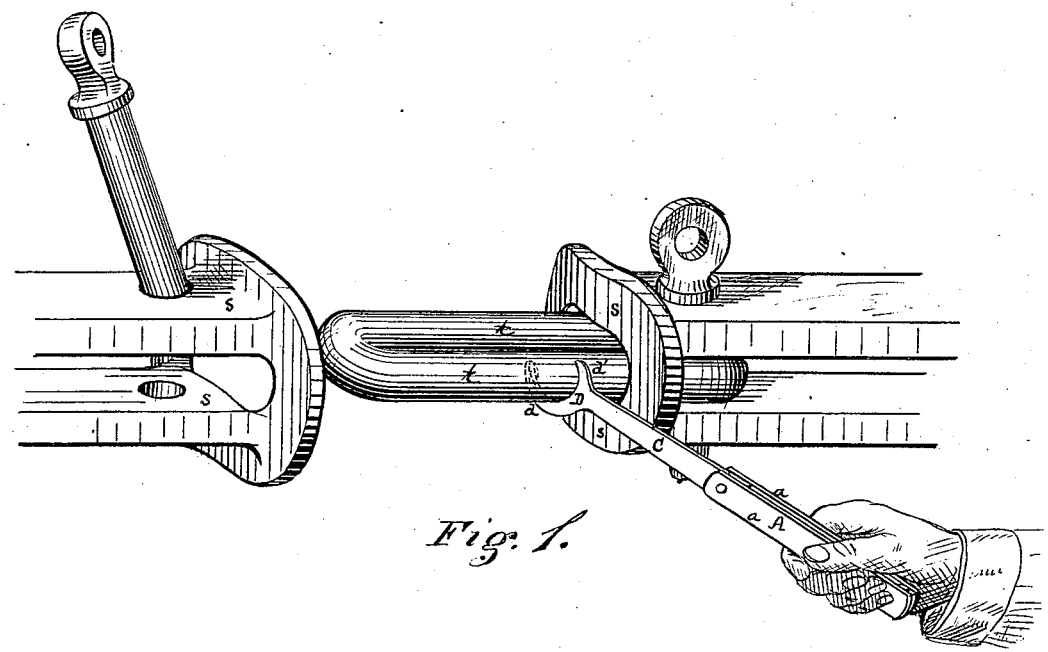
Figure 2:
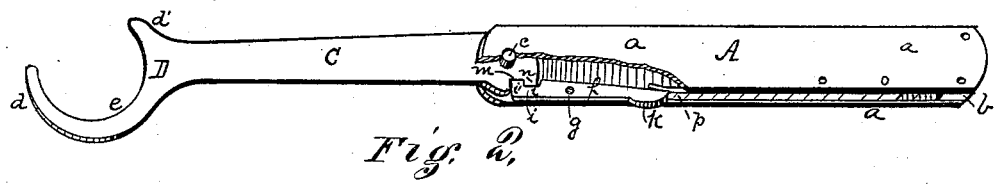
Figure 3:
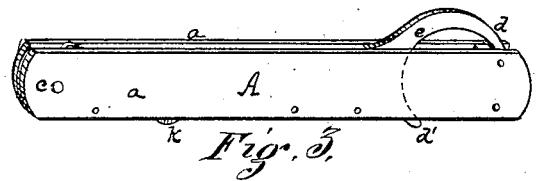

Figure 1 is a perspective view, illustrating the manner of using my improved hand-coupler. Fig. 2 is a like view, partly broken away, of the coupler when opened for use. Fig. 3 is a like view of the coupler when closed for carriage.

Like letters of reference indicate like parts in each.

My invention relates to tools or instruments used for coupling railroad-cars.

Heretofore many different apparatus have been made and invented for this purpose, either for automatically coupling the cars by means of special links or coupling devices or other improvements for guiding the links into place, the invention being to do away with the necessity of holding the link by hand in guiding the link into the bumper, and thus prevent any danger of accident to the brakeman or other workman in making the coupling. These apparatus have not been generally adopted because they were too complicated for use, and were liable to get out of order, and were also expensive, so that the general use of any one of the automatic couplers would entail a great expenditure by the railroads. Hand tools for holding and guiding the link to place have also been used.

The object of my invention is to provide a simple, cheap, and efficient instrument for coupling the cars and guiding the links to place, which can be carried by every brakeman, and by which he can make a coupling as easily and accurately as when the link is held in the hand, and also without risk of injury to him in so doing.

It consists in a hand coupling-tool formed of a suitable handle and a plate pivoted to and adapted to fold within said handle for convenience in carrying, said plate having at its end a double hook, forming a rest, in which one side or bar of the link can be caught to guide it in any direction into the bumper.

To enable others skilled in the art to make and use my invention, I will describe its construction and operation.

In the drawings referred to, A represents the handle of my improved coupling-tool, which is formed of two plates, $a$ $a$, of wrought-iron, of any suitable length, and held apart at the base by a block, $b$, forming a recess for the reception of the coupling-plate C when the tool is folded or closed.

At the top of the handle A is pivoted the coupling-plate C, which is formed of steel, so arranged as to fold into the recess of the handle and so reduce the length of the tool. I find that a coupling-tool having a handle about eight inches in length and a coupling-plate about one-eighth of an inch thick extending, when open, about seven inches from the end of the handle, is the most convenient size for carrying and use.

At the end of the coupling-plate is the double hook D, for catching the link and guiding it to place. The double hook is formed of two hooks or prongs, $d$ $d'$, with a recess or rest, $e$, for the one bar or side of the link to rest in between them. One hook, $d$, extends around and upward beyond the rest $e$, so that it will catch on the bar of the link, and the brakeman can draw the link toward him, and the other hook, $d'$, extends out at the other side of the rest $e$, so that the brakeman can push the link from him. One bar of the link lies in the rest between the hooks, and the link can be raised thereby by the tool and guided into the bumper.

On the upper edge of the coupling-plate, near the pivot $c$ is the notch $m$, forming the lip $n$ at the upper corner of the plate, by means of which notch and lip the plate is locked when opened.

At the back of the handle A is the catch $f$, for locking the coupling-plate when it is opened, the catch being pivoted at $g$ and provided with a notch, $i$, in which the lip $n$ of the plate catches, and lip $i'$, which catches in the notch $m$ of the plate, thus securely locking the plate C until freed from the catch. On the upper surface of the catch is the thumb-piece $k$, by which the catch is pressed down to free the coupling-plate.

At the back of the handle A is secured the flat spring $p$, the end of which presses against the under surface of the catch $f$, holding it out so that the lip $n$ is locked in the notch $i'$ until freed therefrom by pressing on the thumb-piece $k$.

The coupling-plate when not in use can be folded into the handle, thus making a tool that will occupy very little space in the pocket.

My improved coupling-tool is used in the following manner: When a coupling is to be made the link $t$ is held in one bumper, $s$, as shown, and one side is caught by the coupling-tool in the double hook D, which acts instead of the hand, and as the cars come together the link is guided into the opposite bumper or socket by the tool. The link can be moved in any direction in the double hook, being either raised or lowered, drawn back, or pushed forward, and thus being at the entire control of the brakeman holding the tool. As the plate is locked by means of the locking-catch it forms a rigid tool, and is prevented from closing when in use by pressure in any direction.

As the coupling-plate is thin, being generally only about an eighth of an inch in thickness, it is not necessary to withdraw the tool as quickly as the hand in the old style of coupling. The coupling can be done from above on the car, from the side of the car, or from below, the tool acting equally well in either position.

I thus provide a simple and efficient coupler, which is inexpensive, can be carried by the brakeman in his pocket, and precludes the danger of the many painful, if not serious, accidents constantly occurring in coupling cars by hand.

What I claim as my invention, and desire to secure by Letters Patent, is—

The improved car-coupler herein described, formed of the handle A and the plate C, pivoted thereto and adapted to fold therein, said plate being provided at the end with the double hook D and rest $e$, for holding one side or bar of the link and guiding it to place, substantially as set forth.

In testimony whereof I, the said ALEXANDER K. MCKEE, have hereunto set my hand.

ALEXANDER K. McKEE.

Witnesses:
JAMES I. KAY,
WM. K. MELLOR.